US011328139B1

(12) United States Patent
Britts et al.

(10) Patent No.: US 11,328,139 B1
(45) Date of Patent: May 10, 2022

(54) METHOD FOR SCANNING MULTIPLE ITEMS IN A SINGLE SWIPE

(71) Applicant: ZEBRA TECHNOLOGIES CORPORATION, Lincolnshire, IL (US)

(72) Inventors: John Britts, Port Jefferson Station, NY (US); Robert James Pang, Williston Park, NY (US); Pragnesh Kishorbhai Sanchaniya, Bangalore (IN); Sajan Wilfred, Kerala (IN)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 17/197,948

(22) Filed: Mar. 10, 2021

(51) Int. Cl.
 *G06K 7/14* (2006.01)
 *G06K 7/10* (2006.01)
(52) U.S. Cl.
 CPC ....... *G06K 7/10554* (2013.01); *G06K 7/1413* (2013.01)
(58) Field of Classification Search
 CPC .. G06K 7/1404; G06K 7/1413; G06K 7/1443; G06K 7/1452
 USPC ........................................ 235/462.01, 462.08
 See application file for complete search history.

(56) References Cited

U.S. PATENT DOCUMENTS

| | | | | |
|---|---|---|---|---|
| 11,188,727 B1* | 11/2021 | Lloyd | .................. | G06K 7/1413 |
| 2010/0123005 A1* | 5/2010 | Guess | ................ | G06K 7/10871 |
| | | | | 235/383 |
| 2011/0127335 A1* | 6/2011 | He | ........................ | G06K 7/1443 |
| | | | | 235/462.41 |
| 2013/0193211 A1* | 8/2013 | Baqai | ................... | G06K 7/1443 |
| | | | | 235/462.04 |
| 2014/0034736 A1* | 2/2014 | Jia | ........................ | G06K 7/1447 |
| | | | | 235/462.25 |
| 2015/0363625 A1* | 12/2015 | Wu | ..................... | G06K 9/00664 |
| | | | | 382/203 |
| 2016/0055361 A1* | 2/2016 | Lai | ..................... | G06K 7/10732 |
| | | | | 235/462.06 |
| 2020/0019743 A1* | 1/2020 | Lei | ....................... | G06K 7/1443 |
| 2020/0124631 A1* | 4/2020 | Merlo | ................... | G01N 35/10 |
| 2021/0326548 A1* | 10/2021 | Merlo | .................. | G06K 7/1413 |
| 2021/0397800 A1* | 12/2021 | Kim | ..................... | G06K 7/1456 |

* cited by examiner

*Primary Examiner* — Paultep Savusdiphol
(74) *Attorney, Agent, or Firm* — Yuri Astvatsaturov

(57) ABSTRACT

Systems and methods for scanning multiple items in a single swipe are disclosed herein. An example method includes capturing, by an optical imaging assembly, a plurality of images of a field of view (FOV) of the optical imaging assembly. A processor identifies a plurality of indicia from one or more images of the plurality of images. The indicia are indicative of the location of one or more objects of interest within the FOV. The processor decodes each indicia to determine information associated with the one or more objects of interest. The processor further identifies, a frame of interest in one or more images and initiates a dynamic frame that includes each frame of interest. The processor identifies, from the dynamic frame, a background region in the one or more images of the plurality of images, and the processor further removes the background region from the one or more images.

20 Claims, 11 Drawing Sheets

FIG. 5C

METHOD FOR SCANNING MULTIPLE ITEMS IN A SINGLE SWIPE

CROSS-REFERENCE TO RELATED APPLICATION

Background

Conventional barcode scanning system workflows limit the scanning to one item. Typically, the items are scanned in succession one after another in one or more trigger sessions. The serial nature of scanning is inherently slow as one item at a time needs to enter a field-of-view of the scanning system, the barcode then gets decoded, and the item must exit the field-of-view before another item can be scanned. Further, barcode scanning systems cannot determine if an item within the field-of-view has already been decoded, which causes a single item to be scanned multiple times, which is undesirable. Therefore, neither of multiple items of a same item, or different items, are able to be scanned simultaneously which greatly slows down check out processes for consumers and operators of barcode scanning systems. Some software based barcode aggregation mechanism such as MDF and Simulscan have been developed to streamline scanning of items, but these approaches require the barcodes be unique for each item. Further, these methods require that complex rules and templates need to be defined which makes it unsuitable for such use cases. Such methods are also not able to distinguish multiple units of same product present in the same field of view.

Accordingly, there remains a demand for improvements to barcode scanning system workflows to decrease the time required to scan multiple items.

SUMMARY

In an embodiment, the present invention is a method for object identification. The method includes capturing, by an optical imaging assembly, a plurality of images over a field of view (FOV) of the optical imaging assembly; identifying, by a processor, a plurality of indicia from one or more images of the plurality of images, the plurality of indicia being indicative of the location of one or more objects of interest within the FOV of the optical imaging assembly; decoding, by the processor, each indicia of the plurality of indicia to determine information associated with the one or more objects of interest; identifying, in response to decoding of each indicia, and by the processor, a plurality of boundaries of interest in the one or more images of the plurality of images, each boundary of interested including an indicia of the plurality of indicia; tracking, by the processor, each boundary of interest and excluding indicia bound by each boundary of interest from subsequent decoding; and generating, by the processor, a dynamic boundary in the one or more images of the plurality of images, the dynamic boundary derived by encompassing the one or more objects of interest, and the dynamic boundary including each boundary of interest.

In a variation of the current embodiment, identifying the dynamic boundary comprises performing, by the processor, at least one of an edge detection, a Fourier transform, a spatial frequency analysis, optical flow analysis, or background subtraction. In another variation of the current embodiment, each image of the plurality of images has an associated time-stamp indicative of a time that the optical imaging assembly captured the respective image.

In another embodiment, the present invention is an object identification system. The system includes an optical imaging assembly configured to capture a plurality of images over a field of view (FOV) of the optical imaging assembly; a processor and computer-readable media storing machine readable instructions that, when executed, cause the object identification system to: capture, by the optical imaging assembly, a plurality of images over the FOV of the optical imaging system; identify, by the processor, a plurality of indicia from one or more images of the plurality of images, the plurality of indicia being indicative of the location of one or more objects of interest within the FOV of the optical imaging assembly; decode, by the processor, each indicia of the plurality of indicia to determine information associated with the one or more objects of interest; identify, by the processor, a boundary of interest in the one or more images of the plurality of images, each boundary of interested including an indicia of the plurality of indicia; track, by the processor, each boundary of interest and exclude indicia bound by each boundary of interest from subsequent decoding; and generate, by the processor, a dynamic boundary in the one or more images of the plurality of images, the dynamic boundary derived by encompassing the one or more objects, and the dynamic boundary including each boundary of interest.

In a variation of the current embodiment, to identify the dynamic boundary the processor performs at least one of an edge detection, a Fourier transform, a spatial frequency analysis, optical flow analysis, or background subtraction. In another variation of the current embodiment, each image of the plurality of images has an associated time-stamp indicative of a time that the optical imaging assembly captured the respective image.

In yet another embodiment, the present invention is a method for object identification, The method includes capturing, by an optical imaging assembly, a plurality of images over a field of view (FOV) of the optical imaging assembly; identifying, by a processor, an indicia from one or more images of the plurality of images, the indicia being indicative of the location of an object of interest within the FOV of the optical imaging assembly; decoding, by the processor, the indicia to determine information associated with the object of interest; identifying, in response to decoding of the indicia, and by the processor, a boundary of interest in the one or more images of the plurality of images, the boundary of interest including the indicia; tracking, by the processor, the boundary of interest and excluding the indicia bound by the boundary of interest from subsequent decoding; and generating, by the processor, a dynamic boundary in the one or more images of the plurality of images, the dynamic boundary derived by encompassing the object of interest, and the dynamic boundary including the boundary of interest.

In a variation of the current embodiment, the dynamic boundary is further indicative of borders of the object of interest within the FOV of the optical imaging assembly. In yet another variant of the current embodiment, the method further comprises: determining, by the processor, that a new indicia of an image of the plurality of images has not been previously decoded; and decoding, by the processor, the new indicia to determine information associated with an object of interested associated with the new indicia. In another variant of the current embodiment the method identifying the dynamic boundary comprises performing, by the processor, at least one of an edge detection, a Fourier transform, a spatial frequency analysis, optical flow analysis, or background subtraction.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

FIG. 5C illustrates an interface presenting another image captured by the example optical imaging assembly showing a second item entering the first side of the FOV of the optical imaging assembly.

Figure 1:
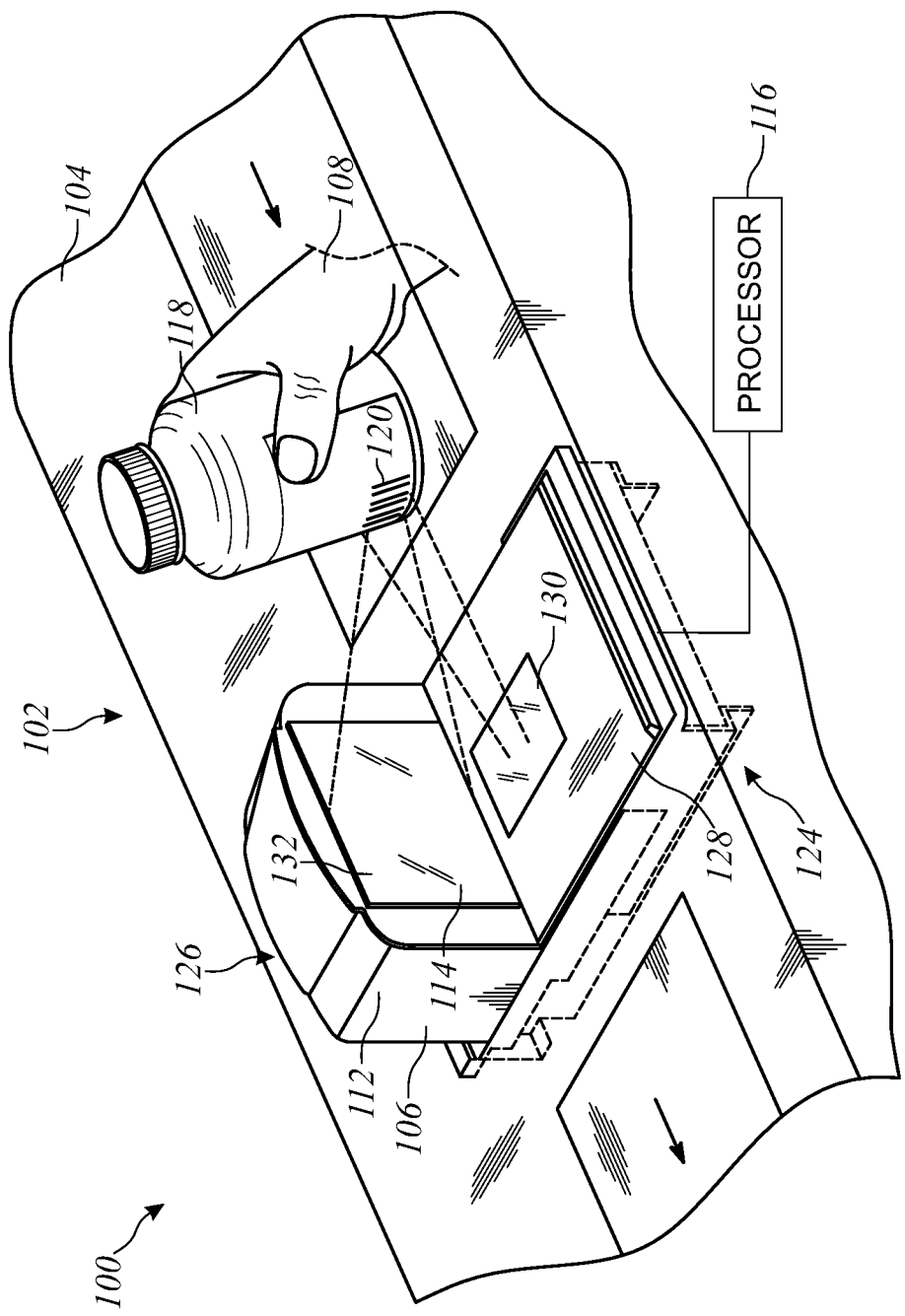
FIG. 1 illustrates a perspective view of an example checkout workstation in accordance with the teachings of this disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

The disclosed systems and methods enable scanning of multiple items in a single swipe, improving scanner workflow and reducing overall scanning times. As described herein. when one or more items are presented together to an imager's field of view, the coordinate of the bounds of all the objects are ascertained and tracked in each of the acquired frames in real-time, using object tracking image processing methods. A captured barcode is decoded and the co-ordinate of the barcode is determined for a boundary, or outlining frame, within the image, with the boundary containing the barcode. The barcode can be mapped within an object group bounding box. The constant position of a barcode with respect to the object group bounding box, allows for the coordinates of objects in subsequent frames to be determined. The position of the decoded barcode can be marked in subsequent frames to prevent the previously decoded barcode from being decoded again in subsequent frames. The systems and methods allow for multiple symbols to be decoded from a single decode session, and ensures that a barcode from one object is decoded and reported only once.

FIG. 1 illustrates a perspective view of an example point-of-sale (POS) system 100 in accordance with the teachings of this disclosure. In the example shown, the system 100 includes a workstation 102 with a counter 104 and a bi-optical (also referred to as "bi-optic") barcode reader 106. The barcode reader 106 may also be referred to as a bi-optic scanner or an indicia reader. The POS system 100 is often managed by a store employee such as a clerk 108. However, in other cases, the POS system 100 may be part of a so-called self-checkout lane where instead of a clerk, a customer is responsible for checking out his or her own products.

The barcode reader 106 includes a housing 112 that houses an optical imaging assembly 114. The optical imaging assembly 114 includes one or more image sensors and is communicatively coupled to a processor 116. The image sensors may include one or more color cameras, one or more monochrome imagers, one or more optical character readers, etc. The processor 116 may be disposed within the barcode reader 106 or may be in another location. The optical imaging assembly 114 includes one or more fields of view (FsOV) as described in further detail below and in connection with FIGS. 2 and 3. Further, the optical imaging assembly 114 is operable to capture one or more images of one or more targets 118 entering and/or being within the FOV. While referenced herein as one or more targets 118, a target 118 may also be referred to herein as an object of interest, or in short, an object. In any embodiment or description, the target 118, or object of interest, includes one or more product codes 120 or indicia indicative of information associated with the target 118.

In practice, the targets 118, depicted as a bottle in the example shown, is swiped past the barcode reader 106. While illustrated as a single target in FIG. 1 for simplicity and clarity, it is envisioned that the bottle represents multiple targets 118 to be imaged by the optical imaging assembly 114, and that the multiple targets 118 may be within a field of view (FOV) of the optical imaging system 114 simultaneously or nearly simultaneously. In doing so, one or more product codes 120 associated with the targets 118 are positioned within the FOV of the optical imaging assembly 114. In the example shown, the product code 120 is a bar code. However, the product code 120 may alternatively be a radio-frequency identification (RFID) tag and/or any other product identifying code.

In response to capturing the one or more images (e.g., image data), in an example, the processor 116 processes the image data to determine an absence, a presence, movement, etc. of the targets 118 within and/or relative to the FOV. Specifically, the processor 116 processes the image data in real time to determine when one or more of the targets 118 enters the FOV of the optical imaging assembly 114, when one or more targets 118 are within the FOV of the optical imaging assembly 114, and/or when one or more of the targets 118 exits the FOV of the optical imaging assembly 114.

In some examples, the optical imaging assembly 114 has a relatively short focal length that allows the foreground in which the one or more targets 118 may be present to be better isolated from the background, thereby allowing for the targets 118 to be more easily identified and/or tracked within the FOV. In some examples, processing the one or more images allows the processor 116 to identify an object that is moving in the FOV and to identify an object that is not moving in the FOV. The processing may also allow the processor 116 to differentiate between a larger item(s) within the FOV and a smaller item(s) within the FOV, a direction that the targets 118 are moving within the FOV, etc.

In an example, when one or more of the targets 118 are detected entering or being within the FOV, the processor 116 initiates an identification session during which one or more product codes 120 carried by the targets 118 can be read/identified. The identification session may be defined as a sequence of activation events such as the activation of the optical imaging assembly 114 as described herein. In some examples, the processor 116 compares the one or more images captured by the optical imaging assembly 114 to preceding ones of the one or more images to detect one or more of the targets 118 entering the FOV or being in the FOV. For example, the targets 118 may be identified using an edge detection technique where a dynamic boundary 122 is defined (the dynamic boundary 122 is more clearly shown in FIGS. 5B, 5C, and 5D). For example, the targets 118 and or the dynamic boundary 122 may be identified by performing an edge detection, a Fourier transform, a spatial frequency analysis, optical flow analysis, or background subtraction, among other techniques. The dynamic boundary 122 is used to determine if an object is moving within the FOV and, more specifically, to identify a leading edge and/or a trailing edge of the object, and other boundaries of the targets 122. The object identified may be further analyzed to determine whether the object corresponds to a product (e.g., targets 118) having a product code 120. The dynamic boundary 122 contains any product codes 120 to be identified and decoded. Further, the processor may identify one or more product codes and determine one or more boundaries of interest 125 around each product code 120. The dynamic boundary 122 adjusts its shape and size dynamically across multiple images with the dynamic boundary 122 containing each of the targets 118 in the FOV of the optical imaging assembly 114. Additionally, the dynamic boundary 122 contains all of the boundaries of interest 125 within the dynamic boundary 122. In an example, when one of the image sensors of the optical imaging assembly 114 detects the targets 118 on either edge (or side) of the FOV (e.g., the frame), the processor 116 enables scanning from both of the image sensors. In some examples, processing the one or more images includes identifying targets 118 based on contrast identified within an image or images. In some examples, the processor 116 initiates the identification session when a target 118 is in the FOV and a preceding target has exited the FOV, or while multiple targets 118 are within the FOV.

After a product code 120 has been decoded, the processor tracks the position of the product code 120 as while the product code 120 remains in the FOV of the optical imaging assembly 114. By tracking the position of the product code 120 it can be determined if the product code 120 has already been decoded and prevent a re-scanning and second reporting of one of the targets 118. If a second target 118 enters the FOV of the optical imaging assembly 114, the processor 116 may determine a boundary of interest around a new product code 120 and the dynamic boundary 122 may adjust to include the new object and new product code 120. The processor 116 may then decode the new product code 120 and track the position of the new product code 120 to prevent further repeated decoding of the new product code 120. Multiple objects may be introduced into, and removed from, the FOV of the optical imaging assembly during a single scanning session to scan any number of product codes 120 to identify and report any number of targets 118.

The processor 116 may be configured to identify the one or more targets 118 based on at least a size of the targets 118, a color of the targets 118, a shape of the targets 118, a feature of the targets 118, a logo displayed on the targets 118, etc. In some examples, identifying the product code 120 includes successfully decoding symbology associated with the targets 118. However, if the targets 118 are detected exiting the FOV and/or entering and exiting the FOV without the product code 120 being identified, the processor 116 may generate an alert indicative of the targets 118 not being scanned. Such an approach may be advantageous in detecting an individual (e.g., the clerk 108) attempting to avoid scanning the targets 118, which may be referred to as the act of "scan avoidance."

After the processor 116 terminates the identification session, in an example, the processor 116 prevents a subsequent identification session from being initiated until one or more targets 118 are detected existing the FOV of the optical imaging assembly 114. To allow the processor 116 to track the position and/or the movement of the targets 118 within the FOV and/or to identify the targets 118 within the FOV, in some examples, the processor 116 determines a background region 127 (the background region 127 is more clearly shown in FIGS. 5A, 5B, 5C, and 5D) that does not contain any objects or product codes 120. The processor may then remove the background region 127 or otherwise filter the background region 127 from image data and may prevent the background region from displaying any image on a user display.

The housing 112 includes a lower housing 124 and a raised housing 126. The lower housing 124 may be referred to as a first housing portion and the raised housing 126 may be referred to as a tower or a second housing portion. The lower housing 124 includes a top portion 128 with a first optically transmissive window 130. The first window 130 is positioned within the top portion 128 along a generally horizontal plane relative to the overall configuration and placement of the barcode reader 106. In some embodiments, the top portion 128 may include a removable or a non-removable platter (e.g., a weighing platter). The top portion 128 can also be viewed as being positioned substantially parallel with the counter 104 surface. As set forth herein, the phrase "substantially parallel" means+/−10° of parallel and/or accounts for manufacturing tolerances. It's worth noting that while, in FIG. 1, the counter 104 and the top portion 128 are illustrated as being about co-planar, that does not have to be the case for the platter and the counter 104 to be considered substantially parallel. In some instances, the counter 104 may be raised or lowered relative to the top surface of the top portion 128, where the top portion 128 is still viewed as being positioned substantially parallel with the counter 104 surface. The raised housing 126 is configured to extend above the top portion 128 and includes a second optically transmissive window 132 positioned in a generally upright plane relative to the top portion 128 and/or the first window 130. Note that references to "upright"

include, but are not limited to, vertical. Thus, as an example, something that is upright may deviate from a vertical axis/plane by as much as 45 degrees.

The optical imaging assembly 114 includes the image sensor(s) that is configured to digitally read the product code 120 through at least one of the first and second windows 130, 132. In the example shown, the field of view (FOV) includes a first sub-FOV 134 (the first sub-FOV 134 is more clearly shown in FIG. 2), a second sub-FOV 136 (the second sub-FOV 136 is more clearly shown in FIG. 2), a third sub field of view 138 (the third sub-FOV 138 is more clearly shown in FIG. 3), and a fourth sub field of view 140 (the fourth sub-FOV 140 is more clearly shown in FIG. 3). In an example, identifying the position of the target 118 through the first and second windows 130, 132 using the optical imaging assembly 114 allows for a virtual three-dimensional (3D) image of the swipe path of the target 118 through the FOV to be identified. The swipe path may include a diagonal swipe path. In addition to monitoring the swipe path, the processor 116 may process the one or more images captured by the optical imaging assembly 114 to track behavior of the clerk 108 including, for example, how the target 118 is held, the swipe direction most followed, etc. Further, the swipe path may be monitored to determine if a given target 118 has already been scanned and/or identified to prevent a re-decoding of a previously decoded product code 120. While the above-example illustrates tracking a single target 118, in other examples, more than one target swipe path may be tracked.

Figure 2:
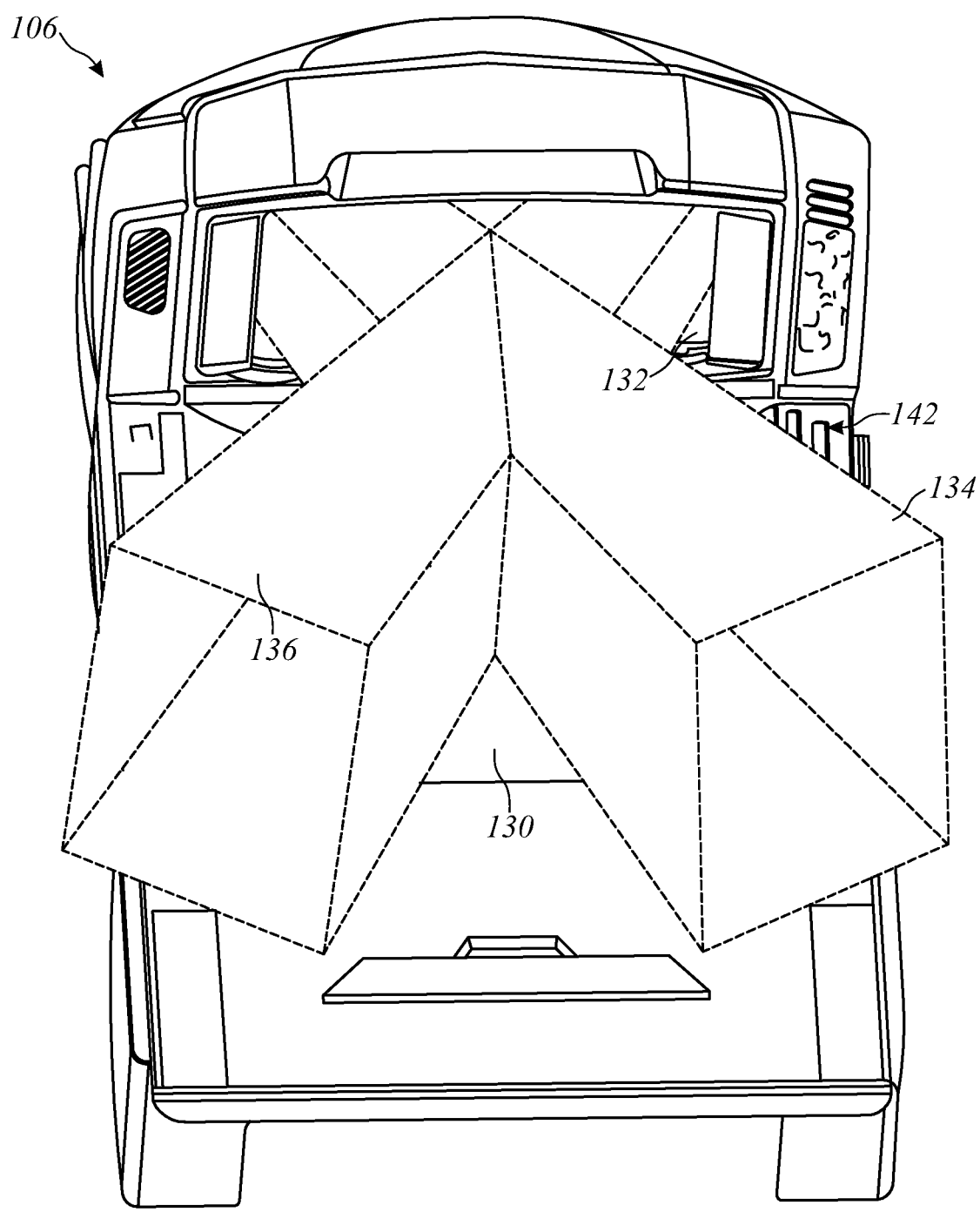
FIG. 2 illustrates example first and second sub-fields of view projecting from a generally vertical window of the barcode reader of FIG. 1.

FIG. 2 illustrates the first and second sub-FsOV 134, 136 projecting from the second window 132 of another example of the barcode reader 106 of FIG. 1. In the currently described embodiment, fold mirrors (not shown) that are carried by the barcode reader 106 are positioned such that the first sub-FOV 134 and the second sub-FOV 136 intersect above the first window 130 and in a product-scanning region 142 of the barcode reader 106. The product-scanning region 142 is the general area where the target 118 is expected to be presented for image capture by the barcode reader 106. In some cases, the fold mirrors can be arranged to cause the first sub-FOV 134 and the second sub-FOV 136 to intersect partially. In other instances, the fold mirrors can be arranged to cause the first sub-FOV 134 and the second sub-FOV 136 to intersect fully. In still other instances, the fold mirrors can be arranged to cause a centroidal axis of each of the first sub-FOV 134 and the second sub-FOV 136 to intersect with or without regard for the cross-sectional dimensions of the FsOV.

Figure 3:
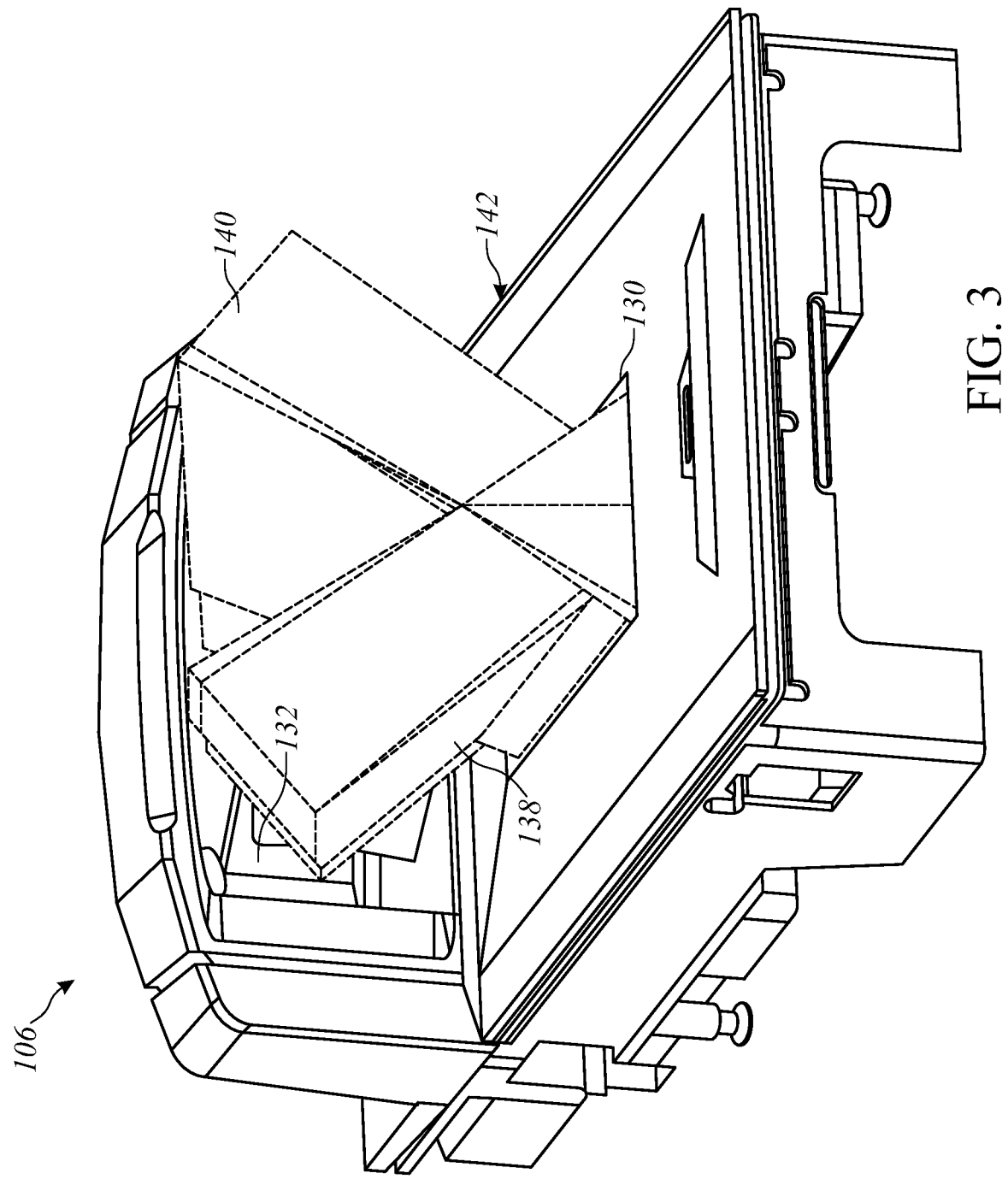
FIG. 3 illustrates example third and fourth sub-fields of view projecting from a generally horizontal window of the barcode reader of FIG. 1.

FIG. 3 illustrates the third and fourth sub FsOV 138, 140 projecting from the first window 130 of the barcode reader 106 of FIG. 2. In the currently described embodiment, the fold mirrors are positioned such that the third sub-FOV 138 and the fourth sub-FOV 140 intersect in front of the second window 132 and in the product-scanning region 142 of the barcode reader 200. In some cases, the fold mirrors can be arranged to cause the third sub-FOV 138 and the fourth sub-FOV 140 to intersect partially. In other instances, the fold mirrors can be arranged to cause the third sub-FOV 138 and the fourth sub-FOV 140 to intersect fully. In still other instances, the fold mirrors can be arranged to cause a centroidal axis of each of the third sub-FOV 138 and the fourth sub-FOV 140 to intersect with or without regard for the cross-sectional dimensions of the FsOV.

Figure 4:
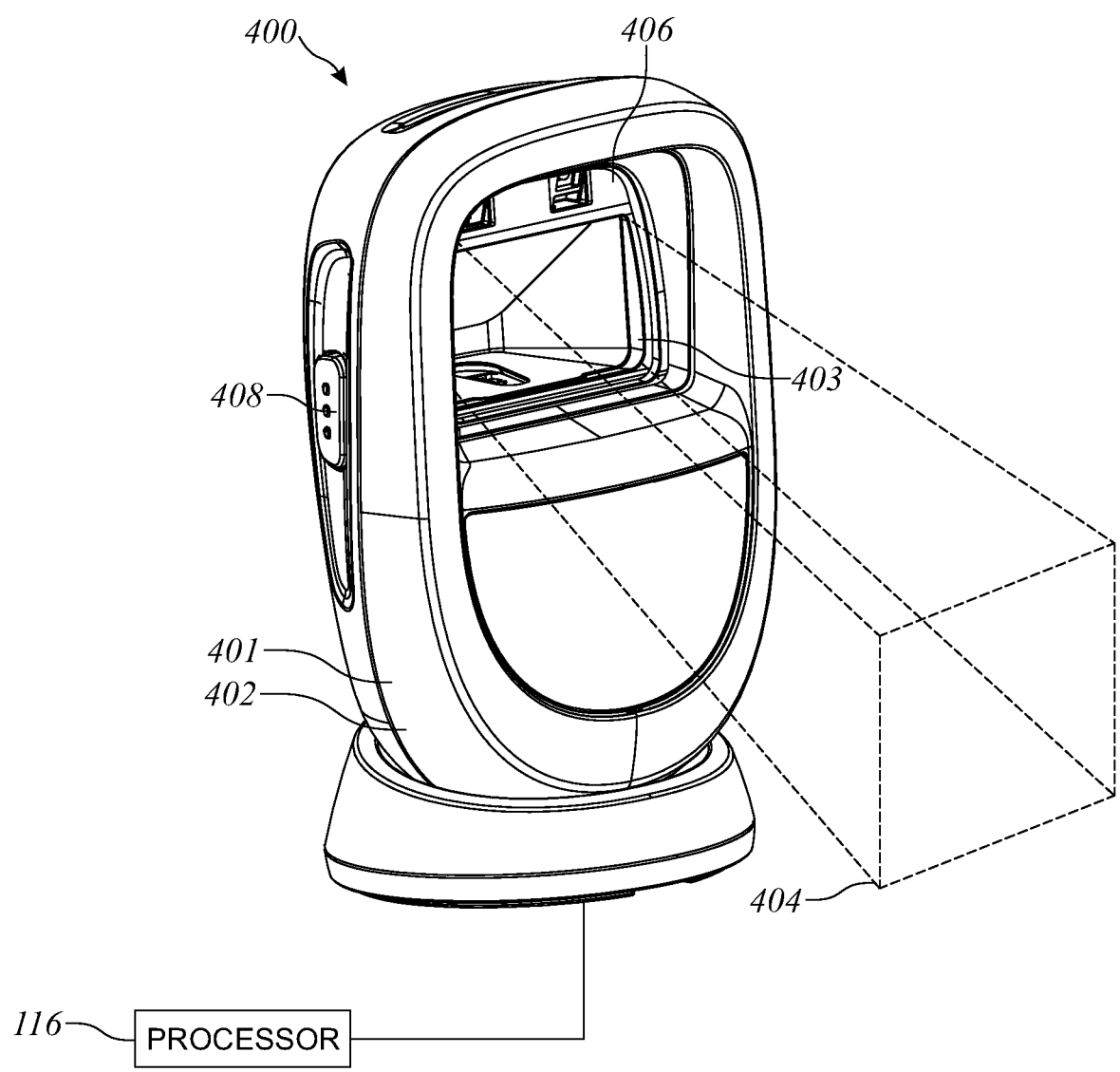
FIG. 4 illustrates an example scanner in accordance with the teachings of this disclosure.

FIG. 4 illustrates a perspective view of an example scanning device 400 in accordance with the teachings of this disclosure. The scanning device 400 may be referred to as an indicia reader. In the example shown, the scanning device 400 includes a housing 401 having a handle or a lower housing portion 402 and an optical imaging assembly 403. The optical imaging assembly 403 is at least partially positioned within the housing 401 and has a FOV 404. The scanning device 400 also includes an optically transmissive window 406 and a trigger 408. The optical imaging assembly 403 may include one or more image sensors that may include a plurality of photo-sensitive elements. The photo-sensitive elements may be arranged in a pattern and may form a substantially flat surface. For example, the photo-sensitive elements may be arranged in a grid or a series of arrays forming a 2D surface. The image sensor(s) of the optical imaging assembly 403 may have an imaging axis that extends through the window 406.

To operate the scanning device 400, a user may engage the trigger 408 causing the scanning device 400 to capture an image of a target, a product code, or another object. Alternatively, in some examples, the scanning device 400 may be activated in a presentation mode to capture an image of the target, the barcode, or the other object. In presentation mode, the processor 116 is configured to process the one or more images captured by the optical imaging assembly 403 to identify a presence of a target, initiate an identification session in response to the target being identified, and terminate the identification session in response to a lack of targets in the FOV 404.

Figure 5A:
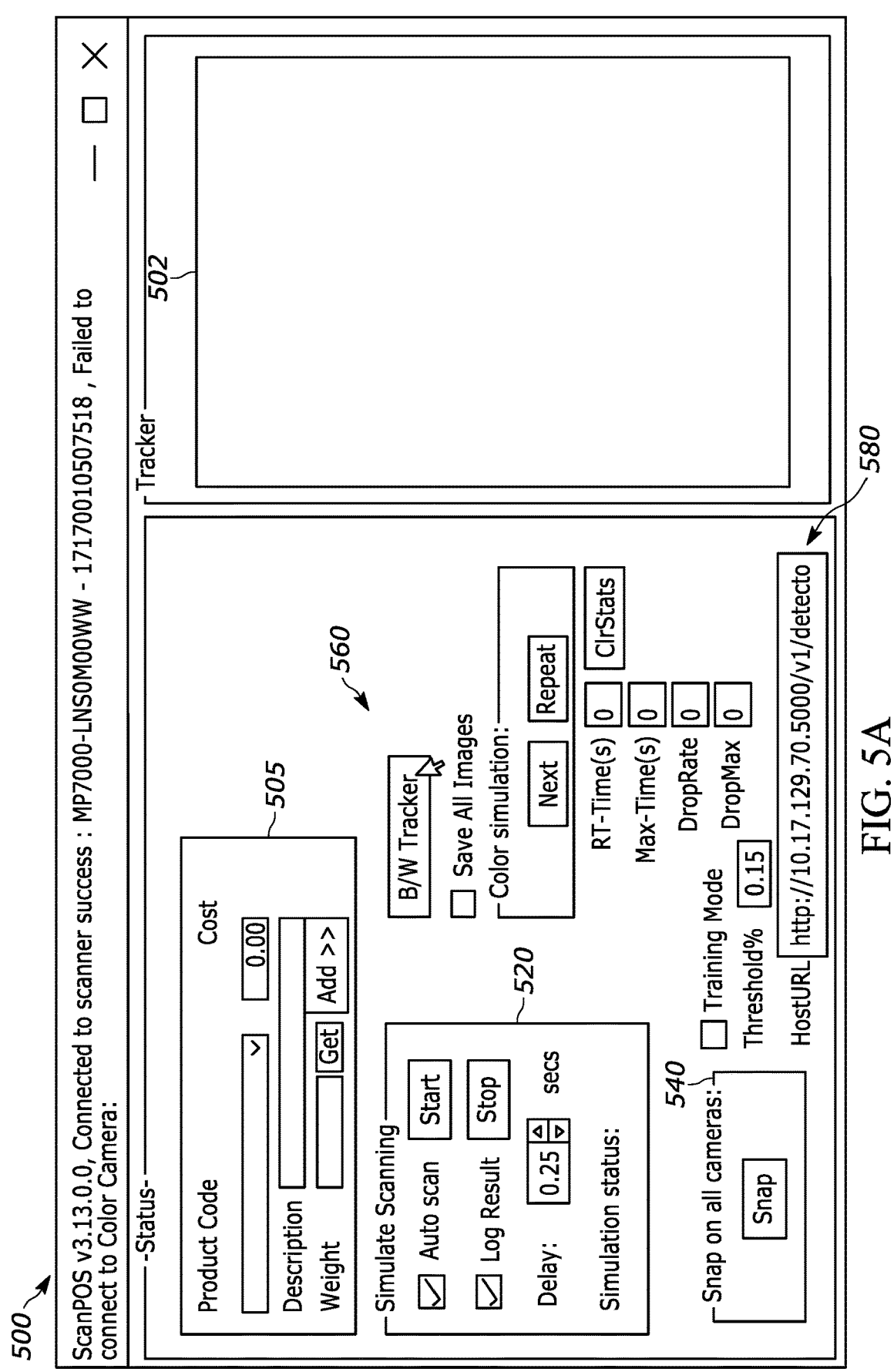
FIG. 5A illustrates an interface that presents images captured by an example optical imaging assembly.

FIG. 5A illustrates an example user interface 500 that may be presented to a user of a scanning device such as the point of sale system 100 of FIG. 1, or the scanning device 400 of FIG. 4. The interface 500 includes an image tracker 502 configured to present images captured by optics and detectors of a scanning device. The image tracker 502 of FIG. 5A displays no images of objects, targets, or product codes. The interface 500 further includes a product information display 505, simulation scanning settings 520, camera controls 540, image controls 560, and processing controls 580.

The image tracker 502 is configured to present images of targets and objects that are in a FOV of an imaging apparatus, such as the optical imaging assembly 114 of FIG. 1. The image tracker 502 is further configured to present a user with boundaries indicative of the dynamic boundary 122, and one or more boundaries of interest 125, as is further discussed in reference to FIGS. 5B through 5E.

The product information display 505 displays information indicative of an identified target within the FOV of an imaging apparatus. For example, a target may enter the FOV of the imaging apparatus and a product code associated with the target may be decoded. The product information display 505 may then display the product code, a cost of the product/target, a description of the target, a weight of the target, and additional aspects and values pertaining to the target.

The camera controls 540 may include toggles for turning on/off any number of cameras of the scanning apparatus. Further, the camera controls 540 may allow a user to control a camera include a position, tilt, capture time, sensitivity, aperture size, or another parameter for a camera to collect images of a field of view.

The image controls 560 include settings and controls for capturing and storing images. For example, the image controls 560 may include a black/white image setting to toggle the capturing of black/white or color images, a setting of how many images to capture and store, an image buffer size, or other image capture and storage settings.

The processing controls 580 include image and data storage locations, a maximum image frame rate, an image frame drop rate, among other controls.

Figure 5B:
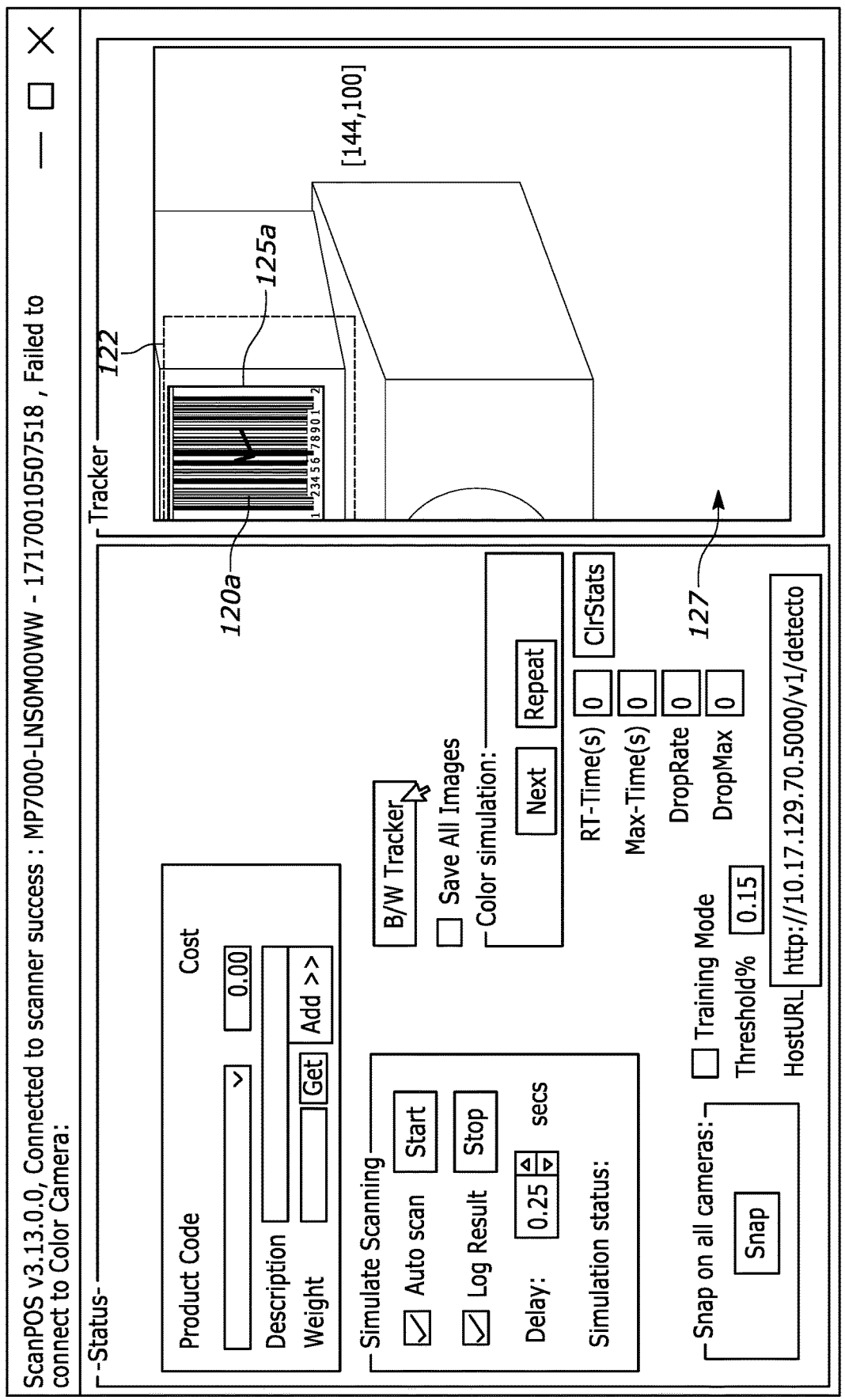
FIG. 5B illustrates an interface presenting an image that includes a bounding box that surrounds an first item as it enters a first side of a FOV of the optical imaging assembly.

FIG. 5B illustrates an interface with the image tracker 502 presenting an image that includes a dynamic boundary 122 and a first boundary of interest 125a. The dynamic boundary 122 surrounds a first item as it enters a first side of a FOV of the imaging apparatus, e.g., a FOV of the optical imaging assembly 114. A first product code 120a is identified on the object, and the first boundary of interest 125a is determine and surrounds the product code 120a. Therefore, the dynamic boundary 122 encompasses edges, or visible parts of the object within the FOV of the imaging apparatus, and the boundary of interest 125a surrounds a barcode or other indicia of the first product code 120a. A processor decodes the first product code 120a and the position of the first boundary of interest 120a is determined and tracked in subsequent image frames to prevent re-decoding and subsequent rescanning and reporting of the first product code 120a. The image tracker 122 may further include a background region 127 that does not include any targets or product codes.

Figure 5C:
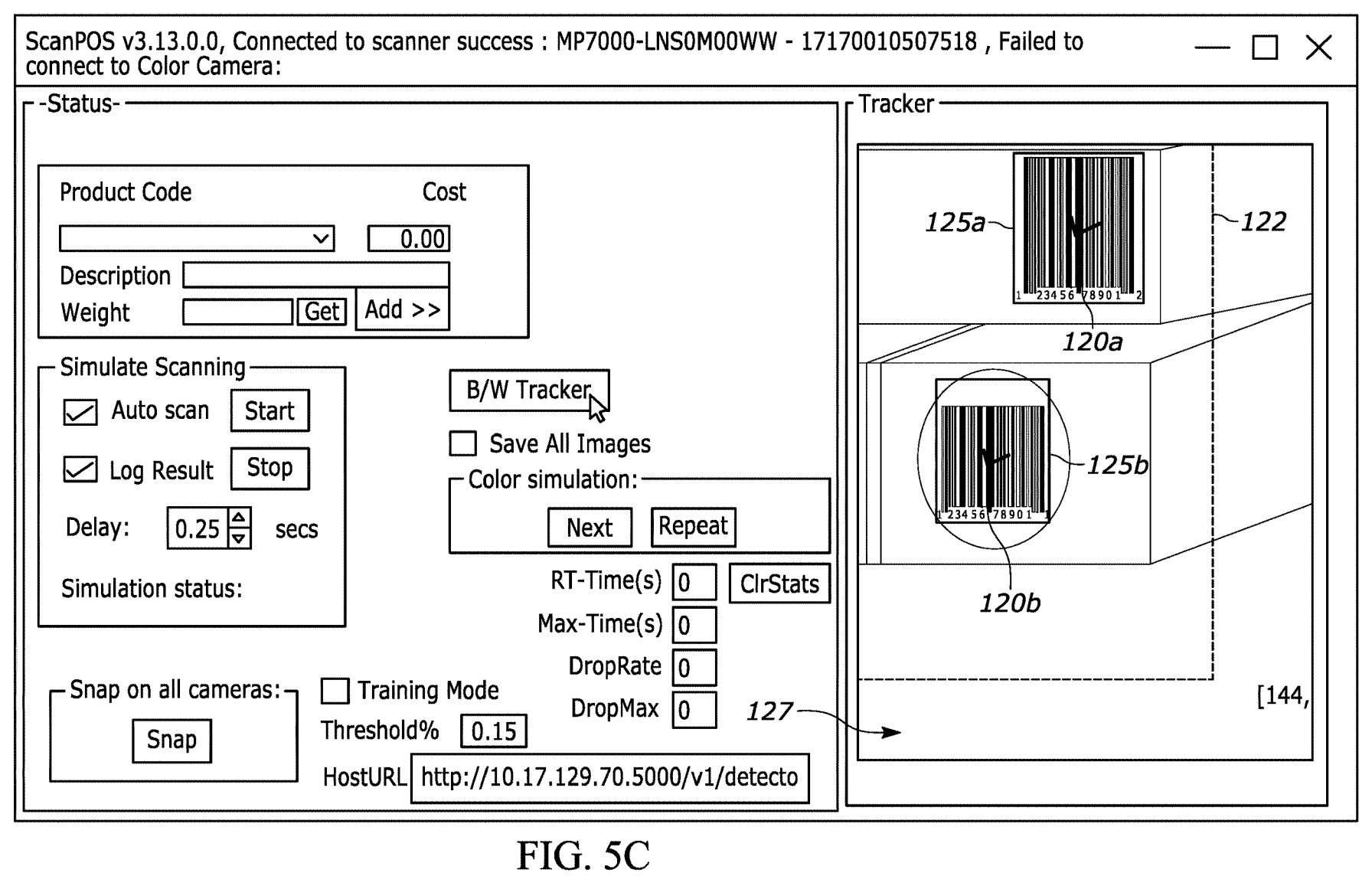

FIG. 5C illustrates an interface presenting another image captured by the imaging apparatus, with the image showing a second object entering the first side of the FOV of the imaging apparatus. A second boundary of interest 125b is determined and surrounds a second product code 10b or other indicia indicative of the second object. The dynamic boundary 122 encompasses both of the first and second boundary of interest 125a and 125b, and edges or visible features of the objects in the FOV of the imaging apparatus. The dynamic boundary 122 changes dynamically across multiple images to encompass features of one or more objects or targets and the targets enter, travel across, and leave the FOV of the imaging apparatus. The processor may determine that the second product code 120b is a new product code that has not been decoded. The processor may then decode the second product code 120b, determine the position of the second boundary of interest 120b, and track the position of the second boundary of interest 120b in subsequent image frames to prevent re-decoding and subsequent rescanning and reporting of the second product code 120a. FIG. 5C further includes a background region 127, with the background region being outside of the dynamic boundary 122. The background region 127 may be determined to be a region of the image that contains no image information that is outside of a determined imaging noise level. Further, a processor may perform image processing to determine static objects and moving objects in the FOV of the imaging apparatus. For example, a static background image of a kiosk or parts of a point of sale system may be determined to be background, while a target item that moves across the FOV of the imaging apparatus may be determined to be an item of interest that is included in the dynamic boundary 122.

Figure 5D:
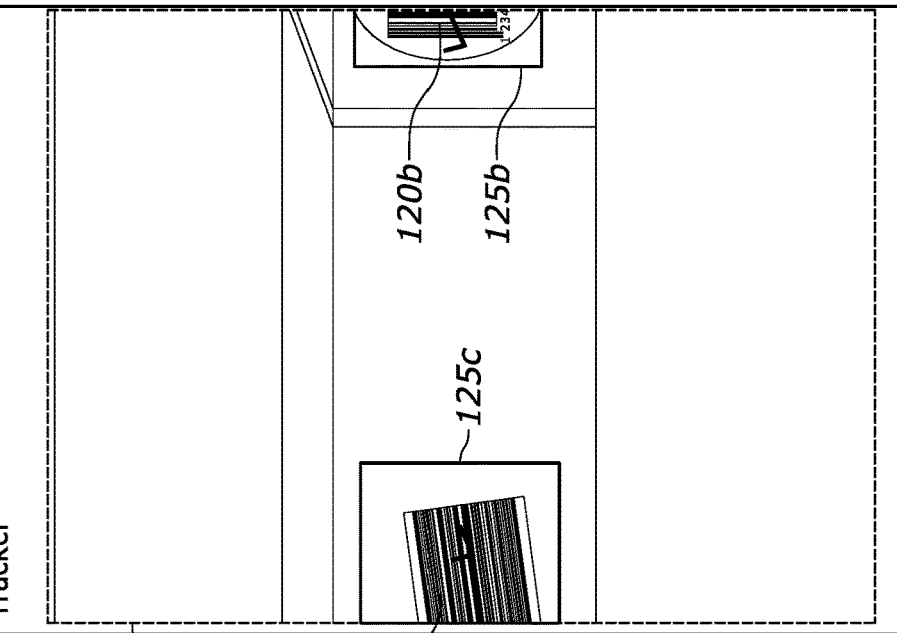
FIG. 5D illustrates an interface presenting another image captured by the example optical imaging assembly showing the second item leaving a second side of the FOV of the optical assembly, and a third item entering the first side of the FOV of the optical imaging assembly.

FIG. 5D illustrates an interface presenting another image captured by the example optical imaging apparatus, with the image showing the second object leaving a second side of the FOV of the optical apparatus, and a third object entering the first side of the FOV of the optical imaging apparatus. The dynamic boundary 122 encompasses the entirety of the image presented by the image tracker 502 to encapsulate all of the targets or objects within the FOV of the imaging apparatus. The first boundary of interest 125a and the first product code 120a have left the FOV of the imaging apparatus and are therefore no presented in the image. The second boundary of interest 125b and the second product barcode 125b are shown as leaving the FOV (e.g., moving from left to right through the image), and a third boundary of interest 125c is determined and presented around a third product barcode 120c. The processor decodes the third product code 120c and the position of the third boundary of interest 120c is determined and tracked in subsequent image frames to prevent re-decoding and subsequent rescanning and reporting of the third product code 120c. The image of FIG. 5D does not include any background region 127, as shown in FIGS. 5B and 5C, due to the fact that the dynamic boundary indicates that objects encompass the entirety of the image presented in the image tracker 122 of FIG. 5D.

Each of the images presented in FIGS. 5B-5D may include a time-stamp associated with each image. Each time-stamp may be indicative of a time that each corresponding images was captured by an optical imaging apparatus. The time-stamps may be used by a processor to compile a sequence of frames of images for tracking of any indicia, objects, boundaries of interest, or dynamic boundaries for performing the methods described herein.

Figure 5E:
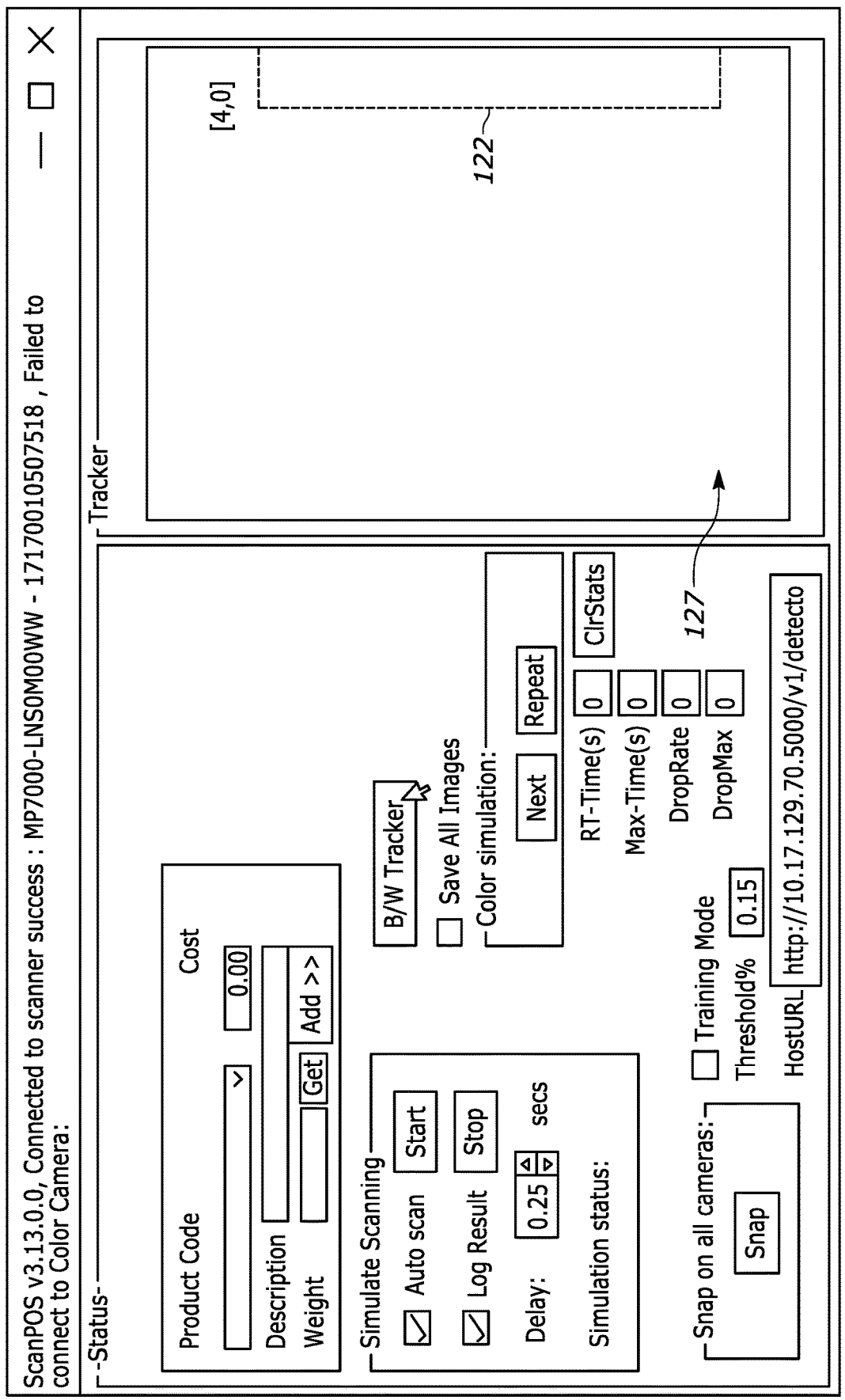
FIG. 5E illustrates an interface presenting an image with no items in the FOV of the optical assembly.

FIG. 5E illustrates an interface presenting an image with no items in the FOV of the optical apparatus. In the image of FIG. 5E, the second and third targets having the second and third products codes 120b and 120c have left the FOV of the imaging apparatus. The dynamic boundary 122 tracks the third object as it leaves the FOV through the right side of the image of FIG. 5E, and after a threshold time the dynamic boundary 122 de-initiates presenting a blank image as shown in FIG. 5A. The dynamic boundary may be ended when it is determined that no indicia is present in the FOV of the imaging apparatus. When the processor ends or de-initiates the dynamic boundary 122, a point of sale, or scanning system, may initiate a new scanning session or perform other actions such as initiate a payment and finalization of sales procedure. The dynamic boundary 122 may be ended or set to a null-set to de-initiate the dynamic boundary 122. Further, a point of sale or scanning system may initiate a new scanning session at any time when an object or product code enters the FOV of the imaging apparatus.

In the example shown in FIGS. 5A through 5E, the each of the boundaries of interest 125a-125c, and the dynamic boundary 122 are two-dimensional (2D) bounding boxes (e.g., a polygram). Alternatively, the boundaries of interest 125a-125c, and the dynamic boundary 122 may independently be a three-dimensional (3D) bounding box. Each bounding box may be positioned around an object that is moving within a foreground of the FOV. Additionally, each bounding box may be positioned around a higher-contrast area of the image. The dynamic boundary 122 may be indicative of one or more boundaries of a target or object of interest in the FOV. In examples in which the object is larger, a bounding box may not completely surround the object. In such examples, a bounding box may be positioned adjacent and/or around the product code of the larger object.

Figure 6:
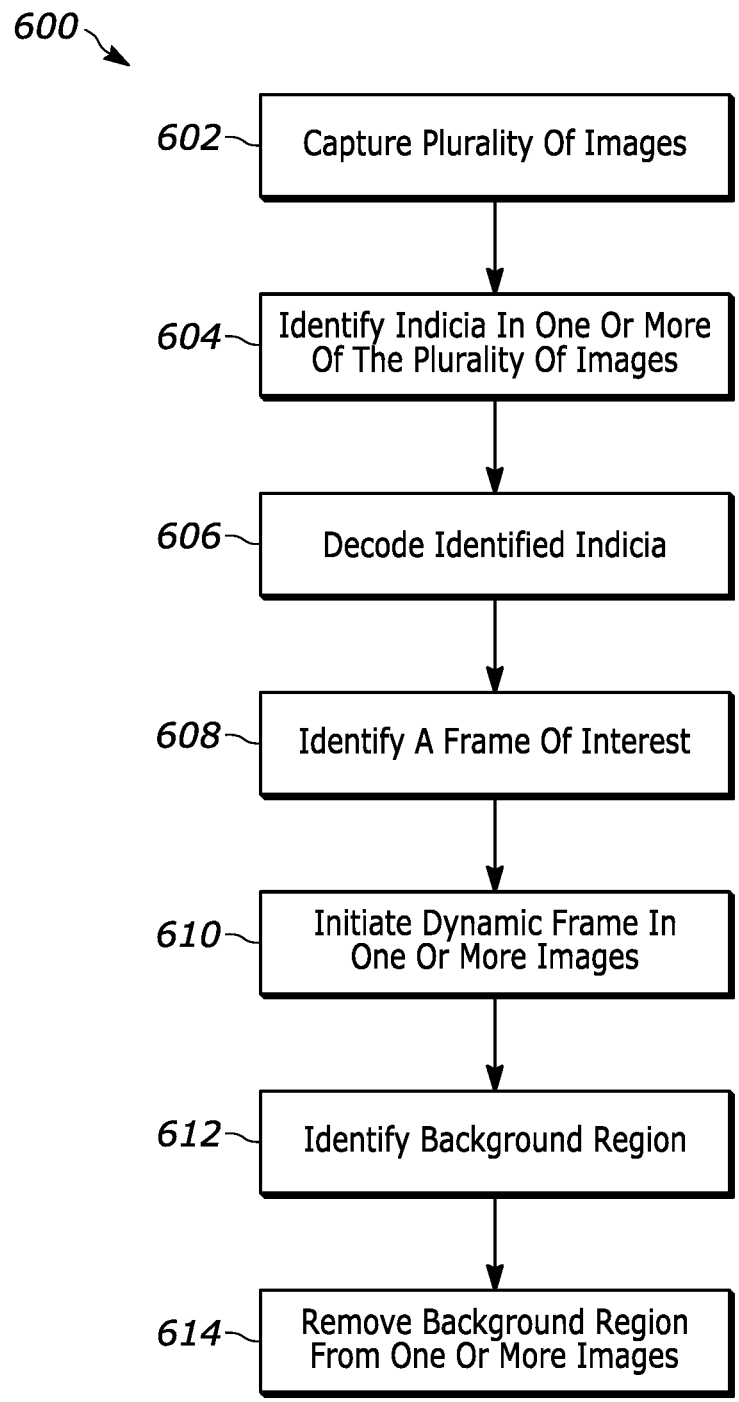
FIG. 6 illustrates a flowchart for a method for performing a method of scanning multiple items in a single swipe, as implemented by the barcode reader of FIG. 1 and/or the scanning device of FIG. 4.

FIG. 6 illustrates a flowchart for performing a method of scanning multiple items in a single swipe, as implemented by the barcode reader 106 of FIG. 1 and/or the scanning device 400 of FIG. 4. A process 600 begins at block 602 with one or more images being captured of a field of view (FOV). In some examples, the one or more images include one or more targets captured by the optical imaging assembly 114 of FIG. 1 and/or the optical imaging assembly 403 of FIG. 4. For simplicity and completeness, the following example will be described in reference to capturing a plurality of images for tracking of targets across multiple images. It should be understood, as described herein, the current method also pertains to capturing a single image having one or more targets may also be captured for decoding of indicia and identification of the one or more targets captured in the single image. Further, while described in reference to decoding and tracking of multiple indicia, the methods described herein may decode and track a single indicia to prevent re-decoding and rescanning of the single indicia.

An identification session is initiated when the target 118 at least one of 1) enters the FOV and 2) is in the FOV. The processor 116 identifies one or more of a plurality of indicia from one or more images of the plurality of image. (block 604). Each of the one or more indicia are indicative of a target 118, and each indicia is further indicative of the location of the associated target 118 within the field of view. In some examples, the processor 116 detects the targets 118 entering and/or being within the FOV by comparing a subsequent image to a preceding image, identifying contrast within the image associated with the targets 118, and/or detecting the presence of the hand 147 of the clerk 108 being presented across (or within) the FOV.

The processor 116 decodes each identified indicia to determine information associated with the one or more targets 118, or objects of interest. (block 606). The processor identifies one or more boundaries of interest in one or more of the plurality of images with each boundary of interest including an identified indicia. (block 608). The processor further identifies a position of each boundary of interest and the processor tracks the position of each boundary of interest to exclude previously decoded indicia within each boundary of indicia for subsequent decoding. A dynamic boundary is generated and presented in one or more of the plurality of images. (block 610) The dynamic boundary encompasses all of the boundaries of interest and the dynamic boundary may change between images of the plurality of images, as illustrated in FIGS. 5B through 5E.

In some examples, it is further identified when the target 118 exits the FOV. In an alternative example, the target 118 is identified exiting the FOV when a trailing edge of a corresponding boundary of interest (i.e., the first boundary of interest 125a for the first target and the associated first product code 120a) exits the FOV. Regardless, movement of the target 118 within and/or relative to the FOV may be tracked based on movements of a boundary of interest and/or the dynamic boundary 122.

The processor identifies a background region in one or more images of the plurality of images. (block 612). The background region may be determined by comparing a calibration image (e.g., a static background image containing no targets), with an image having one or more targets. Further, the background region may be determined by performing image processing to determine edges of targets, and removing areas of the image that do not contain a target object for scanning. The processor may remove the background region from an image and provide the new image, with the background region removed, to a user interface or display for a user to view and/or evaluate. (block 614). The background region may be removed through filtering, background subtraction, or another processing method.

Figure 7:
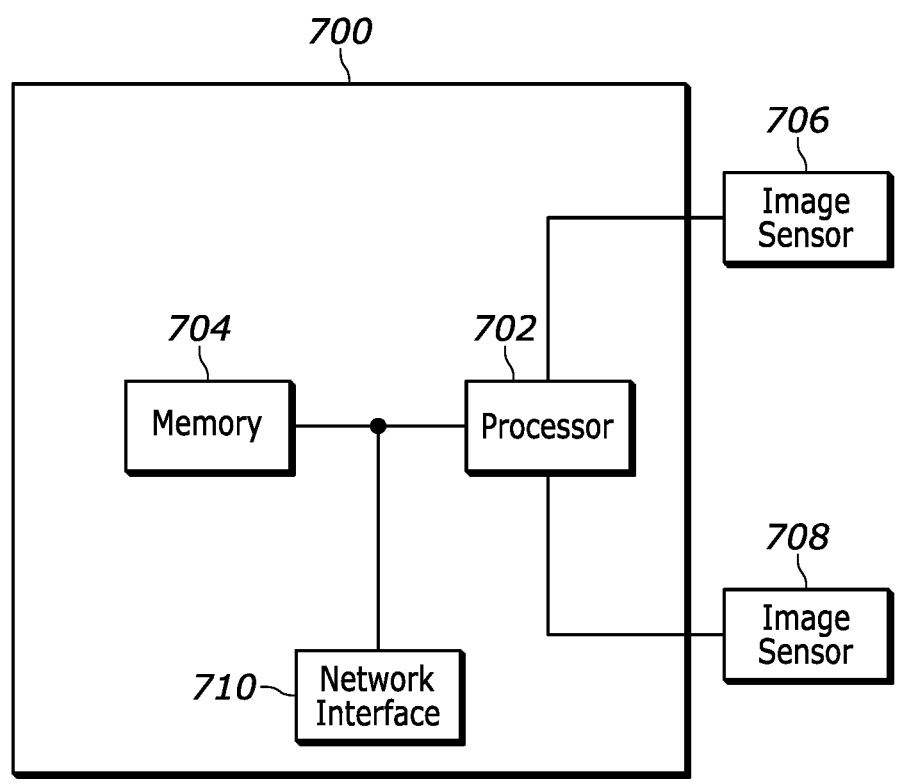
FIG. 7 illustrates an example processor platform coupled to a first image sensor and a second image sensor that can be used to implement the teachings of this disclosure.

FIG. 7 is a block diagram representative of an example processor platform 700 capable of implementing, for example, one or more components of the example systems for scanning multiple items in a single swipe. The processor platform 700 includes a processor 702 and memory 704. In the example shown, the processor is coupled to a first image sensor 706 and a second image sensor 708. The processor platform 700 and/or one or more of the image sensors 706, 708 may be used to implement the system 100 of FIG. 1 and/or the scanning device 400 of FIG. 4.

The memory capable of executing instructions to, for example, implement operations of the example methods described herein, as may be represented by the flowcharts of the drawings that accompany this description. Other example logic circuits capable of, for example, implementing operations of the example methods described herein include field programmable gate arrays (FPGAs) and application specific integrated circuits (ASICs).

The memory (e.g., volatile memory, non-volatile memory) 704 accessible by the processor 702 (e.g., via a memory controller). The example processor 702 interacts with the memory 704 to obtain, for example, machine-readable instructions stored in the memory 704 corresponding to, for example, the operations represented by the flowcharts of this disclosure. Additionally or alternatively, machine-readable instructions corresponding to the example operations described herein may be stored on one or more removable media (e.g., a compact disc, a digital versatile disc, removable flash memory, etc.) that may be coupled to the processing platform 700 to provide access to the machine-readable instructions stored thereon.

The example processing platform no of FIG. 7 also includes a network interface 710 to enable communication with other machines via, for example, one or more networks. The example network interface 710 includes any suitable type of communication interface(s) (e.g., wired and/or wireless interfaces) configured to operate in accordance with any suitable protocol(s).

The above description refers to a block diagram of the accompanying drawings. Alternative implementations of the example represented by the block diagram includes one or more additional or alternative elements, processes and/or devices. Additionally or alternatively, one or more of the example blocks of the diagram may be combined, divided, re-arranged or omitted. Components represented by the blocks of the diagram are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions. The above description refers to various operations described herein and flowcharts that may be appended hereto to illustrate the flow of those operations. Any such flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged or omitted. In some examples, the operations described herein are implemented by machine-readable instructions (e.g., software and/or firmware) stored on a medium (e.g., a tangible machine-readable medium) for execution by one or more logic circuits (e.g., processor(s)). In some examples, the operations described herein are implemented by one or more configurations of one or more specifically designed logic circuits (e.g., ASIC(s)). In some examples the operations described herein are implemented by a combination of specifically designed logic circuit(s) and machine-readable instructions stored on a medium (e.g., a tangible machine-readable medium) for execution by logic circuit(s).

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)). Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

We claim:

1. A method for object identification, the method comprising:
    capturing, by an optical imaging assembly, a plurality of images over a field of view (FOV) of the optical imaging assembly;
    identifying, by a processor, a plurality of indicia from one or more images of the plurality of images, the plurality of indicia being indicative of the location of one or more objects of interest within the FOV of the optical imaging assembly;
    decoding, by the processor, each indicia of the plurality of indicia to determine information associated with the one or more objects of interest;
    identifying, in response to decoding of each indicia, and by the processor, a plurality of boundaries of interest in the one or more images of the plurality of images, each boundary of interested including an indicia of the plurality of indicia;
    tracking, by the processor, each boundary of interest and excluding indicia bound by each boundary of interest from subsequent decoding; and
    generating, by the processor, a dynamic boundary in the one or more images of the plurality of images, the dynamic boundary derived by encompassing the one or more objects of interest, and the dynamic boundary including each boundary of interest.

2. The method of claim 1, wherein identifying the dynamic boundary comprises performing, by the processor, at least one of an edge detection, a Fourier transform, a spatial frequency analysis, optical flow analysis, or background subtraction.

3. The method of claim 1, wherein the optical imaging assembly comprises a bioptic scanner.

4. The method of claim 1, wherein each of the images of the plurality of images has an associated time-stamp indicative of a time that the optical imaging assembly captured the respective image.

5. The method of claim 1, wherein the dynamic boundary is further indicative of borders of the one or more objects of interest within the FOV of the optical imaging assembly.

6. The method of claim 1, further comprising:
identifying, by the processor, from the dynamic boundary, a background region in the one or more images of the plurality of images; and
filter, by the processor, the background region from the one or more images of the plurality of images.

7. The method of claim 1, further comprising:
determining, by the processor, that a new indicia of an image of the plurality of images has not been previously decoded; and
decoding, by the processor, the new indicia to determine information associated with an object of interested associated with the new indicia.

8. The method of claim 1, further comprising:
determining, by the processor, that an image of the plurality of images has no indicia; and
ending, by the processor, the dynamic boundary.

9. An object identification system comprising:
an optical imaging assembly configured to capture a plurality of images over a field of view (FOV) of the optical imaging assembly;
a processor and computer-readable media storing machine readable instructions that, when executed, cause the object identification system to:
capture, by the optical imaging assembly, a plurality of images over the FOV of the optical imaging system;
identify, by the processor, a plurality of indicia from one or more images of the plurality of images, the plurality of indicia being indicative of the location of one or more objects of interest within the FOV of the optical imaging assembly;
decode, by the processor, each indicia of the plurality of indicia to determine information associated with the one or more objects of interest;
identify, by the processor, a boundary of interest in the one or more images of the plurality of images, each boundary of interested including an indicia of the plurality of indicia;
track, by the processor, each boundary of interest and exclude indicia bound by each boundary of interest from subsequent decoding; and
generate, by the processor, a dynamic boundary in the one or more images of the plurality of images, the dynamic boundary derived by encompassing the one or more objects, and the dynamic boundary including each boundary of interest.

10. The object identification system of claim 9, wherein to identify the boundary of interest the machine-readable instructions further cause the object identification system to perform, by the processor, at least one of an edge detection, a Fourier transform, a spatial frequency analysis, optical flow analysis, or background subtraction.

11. The object identification system of claim 9, wherein the optical imaging assembly comprises a bioptic scanner.

12. The object identification system of claim 9, wherein each of the images of the plurality of images has an associated time-stamp indicative of a time that the optical imaging assembly captured the respective image.

13. The object identification system of claim 9, wherein the dynamic boundary is further indicative of borders of the one or more objects of interest within the FOV of the optical imaging assembly.

14. The object identification system of claim 9, wherein the machine readable instructions further cause the object identification system to:
identify, by the processor, from the dynamic frame, a background region in the one or more images of the plurality of images; and
filter, by the processor, the background region from the one or more images of the plurality of images.

15. The object identification system of claim 9, wherein the machine readable instructions further cause the object identification system to:
determine, by the processor, that a new indicia of an image of the plurality of images has not been previously decoded; and
decode, by the processor, the new indicia to determine information associated with an object of interested associated with the new indicia.

16. The object identification system of claim 9, wherein the machine readable instructions further cause the object identification system to:
determine, by the processor, that an image of the plurality of images has no indicia; and
end, by the processor, the dynamic boundary.

17. A method for object identification, the method comprising:
capturing, by an optical imaging assembly, a plurality of images over a field of view (FOV) of the optical imaging assembly;
identifying, by a processor, an indicia from one or more images of the plurality of images, the indicia being indicative of the location of an object of interest within the FOV of the optical imaging assembly;
decoding, by the processor, the indicia to determine information associated with the object of interest;
identifying, in response to decoding of the indicia, and by the processor, a boundary of interest in the one or more images of the plurality of images, the boundary of interest including the indicia;
tracking, by the processor, the boundary of interest and excluding the indicia bound by the boundary of interest from subsequent decoding; and
generating, by the processor, a dynamic boundary in the one or more images of the plurality of images, the dynamic boundary derived by encompassing the object of interest, and the dynamic boundary including the boundary of interest.

18. The method of claim 17, wherein the dynamic boundary is further indicative of borders of the object of interest within the FOV of the optical imaging assembly.

19. The method of claim 17, further comprising:
determining, by the processor, that a new indicia of an image of the plurality of images has not been previously decoded; and decoding, by the processor, the new indicia to determine information associated with an object of interested associated with the new indicia.

20. The method of claim 17, wherein identifying the dynamic boundary comprises performing, by the processor, at least one of an edge detection, a Fourier transform, a spatial frequency analysis, optical flow analysis, or background subtraction.

* * * * *